455/13

United States Patent

Mori

[15] 3,676,778

[45] July 11, 1972

[54] SATELLITE COMMUNICATION SYSTEM

[72] Inventor: Yoshibumi Mori, Tokyo, Japan

[73] Assignee: Nippon Telegraph and Telephone Public Corporation, Tokyo, Japan

[22] Filed: Aug. 20, 1970

[21] Appl. No.: 65,653 J6-28-67 dr

Related U.S. Application Data

[63] Continuation-in-part of Ser. No. 738,069, June 18, 1968, abandoned.

[52] U.S. Cl. ....................325/4, 325/15, 325/53, 325/56, 325/65, 325/67

[51] Int. Cl. ....................H04b 1/54

[58] Field of Search ....................325/4, 15, 56, 63, 65, 67, 325/303, 301, 302, 51, 52, 53, 55; 343/228, 175

[56] References Cited

UNITED STATES PATENTS

| | | | |
|---|---|---|---|
| 3,160,813 | 12/1964 | Biggi | 325/63 X |
| 3,331,071 | 7/1967 | Webb | 325/63 X |
| 3,001,064 | 9/1961 | Alexis | 325/63 X |

*Primary Examiner*—Robert L. Griffin
*Assistant Examiner*—Kenneth W. Weinstein
*Attorney*—Watson, Cole, Grindle & Watson

[57] ABSTRACT

Attenuation caused by precipitation in a radio satellite communication system is minimized by monitoring transmission between the stations and the rate of precipitation at each station so that frequency bands having low attenuation to precipitation may be assigned to the stations in accordance with their rate of precipitation. A local monitor and controller provides switching information in response to the rate of precipitation to switch the transmission and reception respectively to transmitting and receiving frequency converters which operate in selected frequency bands.

4 Claims, 14 Drawing Figures

B1223(63 = Figs 1-3+8

SATELLITE COMMUNICATION SYSTEM

This is a continuation-in-part of application Ser. No. 738,069, filed June 18, 1968, and now abandoned.

This invention relates to a radio communication system and, more particularly, to a radio communication system using a plurality of terrestrial stations and at least one satellite repeating station wherein the effect of attenuation caused by precipitation is reduced or eliminated by altering the frequency transmission in accordance with the rate or severity of precipitation at the individual station sites.

UHF (ultra high frequency) communication systems have been adopted for high capacity terrestrial radio communications and in such systems, the transmission quality is seriously reduced by fading, especially at carrier frequencies of several GHz. Further, attenuation caused by precipitation, such as rainfall, snowfall or sleet, etc., is experienced when the carrier frequency is over approximately 10 GHz.

When there is severe fading, the receiving capabilities of the repeating installation is reduced to zero, which results in unavoidable circuit interruption. However, in a multi-channel system using the same propagation path, circuit interruption commonly occurs simultaneously in only one channel or, at most, a few channels. To avoid loss of communication and to reduce the period of circuit interruption, prior art communication systems have utilized switching networks to transfer the transmission to an operative channel or communication link.

Attenuation caused by, for example, rainfall does not increase infinitely and circuit interruption may be eliminated or considerably reduced by increasing transmission power and reducing the distance between relay stations. However, such a communication system is complex and uneconomical. Consequently, the system is designed to allow for some circuit interruption. Thus, in the case of heavy precipitation, circuit interruption occurs over and throughout the entire system using the effected frequency band and the duration of the circuit interruptions is longer than that which is experienced for fading alone. To remedy such undesirable conditions, prior art systems switch or transfer to another frequency band having less attenuation, which switching may utilize the same or a different communication path, or the communication link is established over a wire system. In such systems the decrease in circuit interruption is achieved with a resultant decrease in the efficiency of the various repeating installations throughout the communication network.

Satellite communication systems normally are designed to handle a large number of radio communications between earth stations and a satellite repeating station; however, in a UHF system in which the attenuation produced by precipitation is slight, the traffic capacity of the communication system is necessarily considerably limited in order to avoid mutual interference between the terrestrial radio stations. Therefore, for effective utilization of a satellite communication system, it is necessary to utilize wide band UHF frequencies within which attenuation caused by precipitation is significant and it is therefore necessary to provide such a system that is not greatly affected by such attenuation in order to achieve a high capacity satellite communication system. Further, substantial increases in the transmitting power of the satellite are not practical because of the commensurate weight and expense and also the necessity of establishing the satellite in a precise orbit. Thus, a satellite communication system which reduces the attenuation caused by precipitation in a simple and economic manner will realize advantages in the reduction of the necessary transmitting power required between the satellite and the terrestrial stations, reduce the interference with other communication systems and greatly enhance or increase the economical use of such a system.

Therefore, it is a primary object of the present invention to provide a satellite radio communication system wherein high capacity transmission may be economically realized.

A further object of the present invention is to provide such a satellite communication system which has improved high quality transmission capabilities and which minimizes or reduces the interference with other communication systems.

The foregoing objects and advantages of the improved satellite communication system will be readily understood from the following description taken in conjunction with the drawings wherein.

Figure 8:
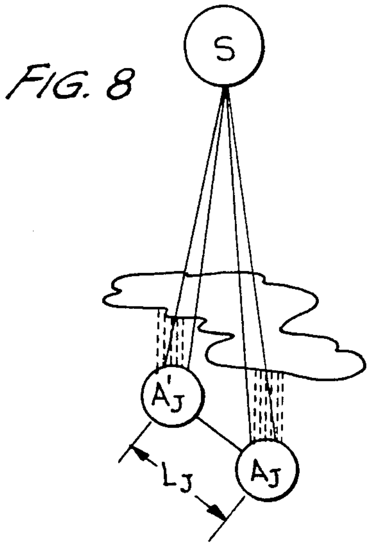
Figures 4A, 4B, 5A:
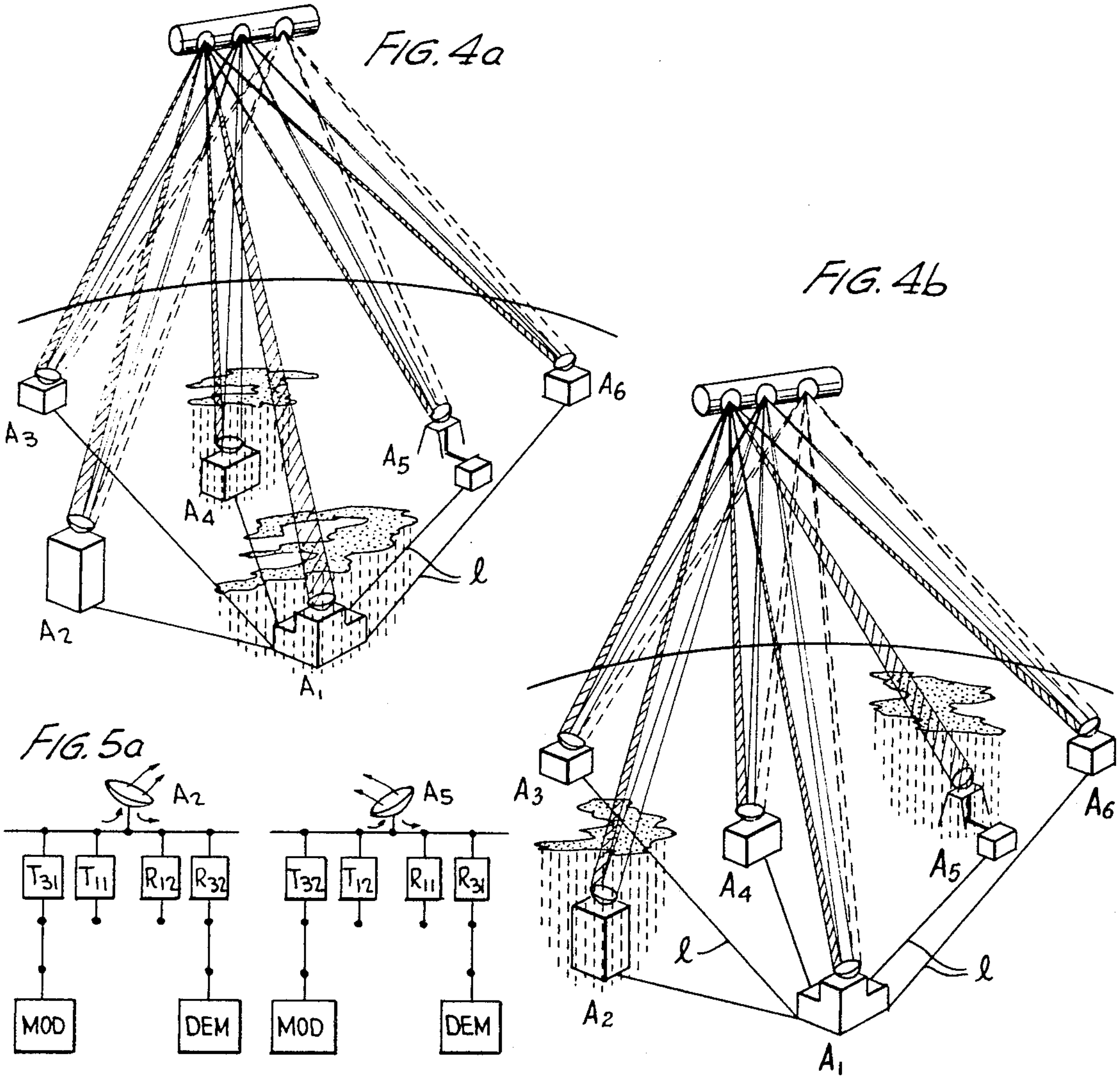
Figures 6A, 6B:
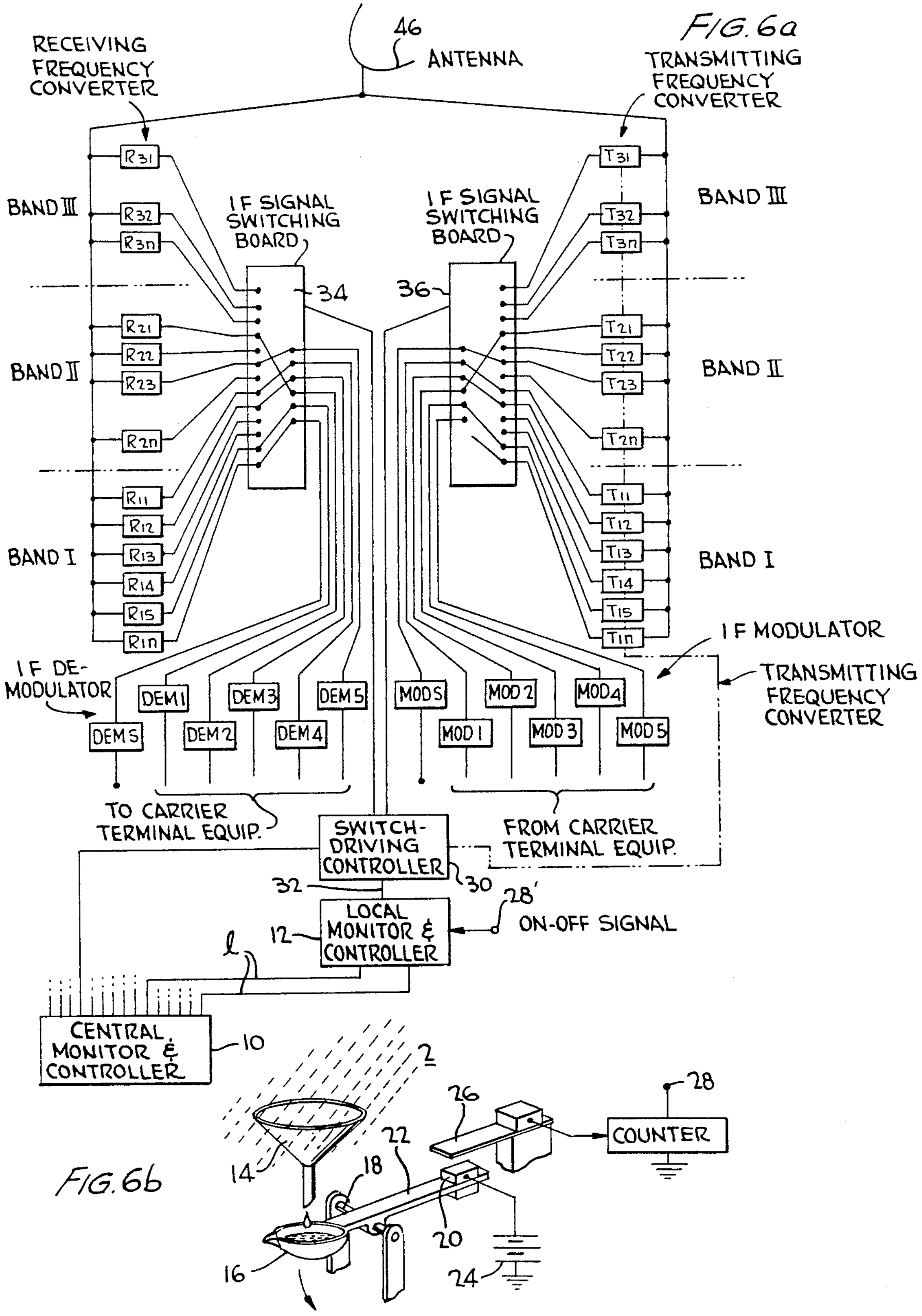
Figure 7A:
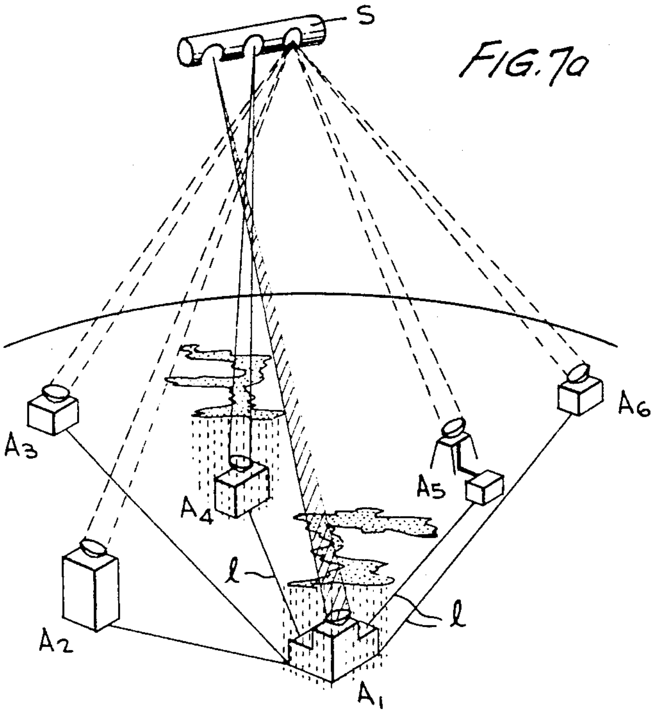
Figure 7B:
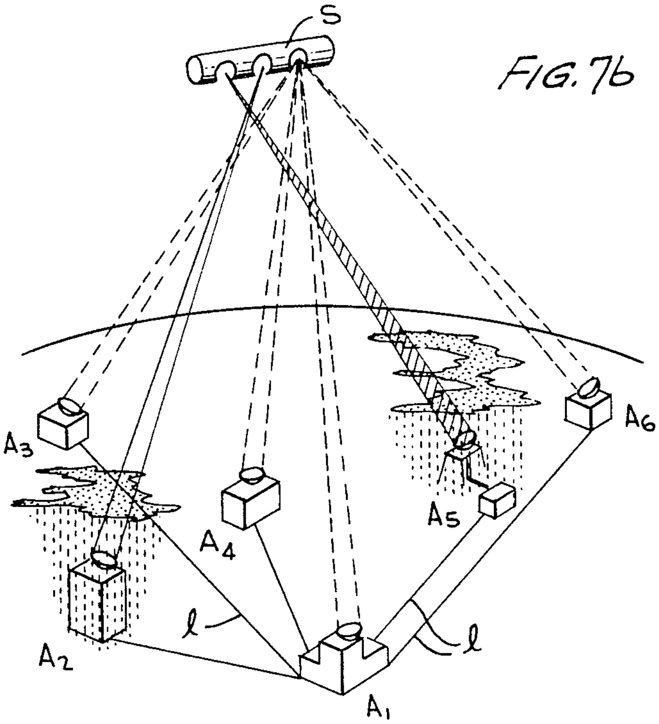

FIGS. 4*a* and 4*b* are perspective views of a satellite communication system in accordance with the invention illustrating the frequency band allotments between earth stations $A_1$–$A_6$ and satellite S wherein only the earth station has a selective frequency band circuit;

FIGS. 5*a*–5*d* are block diagrams showing the switching arrangements for connecting the transmitting and receiving circuits between the communication stations;

FIG. 6*a* is a block diagram illustrating an embodiment of the frequency band switching connecting circuit of the present invention;

FIG. 6*b* illustrates a means for determining the precipitation at a given earth station to afford a means for controlling the switching of the frequency band transmissions;

FIGS. 7*a* and 7*b* are perspective views illustrating the frequency band allotments between the earth stations and the satellite where both the satellite and the earth stations have selective frequency band circuits; and FIG. 8 illustrates a further embodiment for increasing the transmission effectiveness by reducing the attenuation caused by precipitation.

Figure 1:
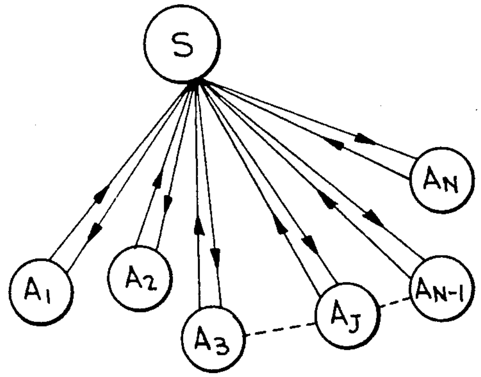
FIG. 1 illustrates a satellite communication system wherein transmission is established between a plurality of terrestrial stations and a satellite repeating station.

As shown FIG. 1, N earth stations $A_1$–$A_N$ communicate with one another by means of a satellite repeating station S and such a communication system uses a carrier frequency band of $F_1$–$F_2$ in which attenuation caused by precipitation increases progressively with increasing frequency. At the locations of the respective earth stations $A_1$, $A_2$, $A_3$ ... $A_N$, the maximum values of the precipitation rate R (per unit time) may be respectively represented by $Rm_1$, $Rm_2$, $Rm_3$ ... $Rm_N$. If the frequency range $F_1$–$F_2$ is selected so that the transmission between the earth stations and the satellite are kept within a minimum required transmission quality even under the maximum precipitation rates, the cost of the necessary equipment in both the repeating satellite and the earth stations becomes extremely expensive; and if the cost is reduced by lower quality circuits, the efficiency of the communication system is greatly reduced.

Figure 2:
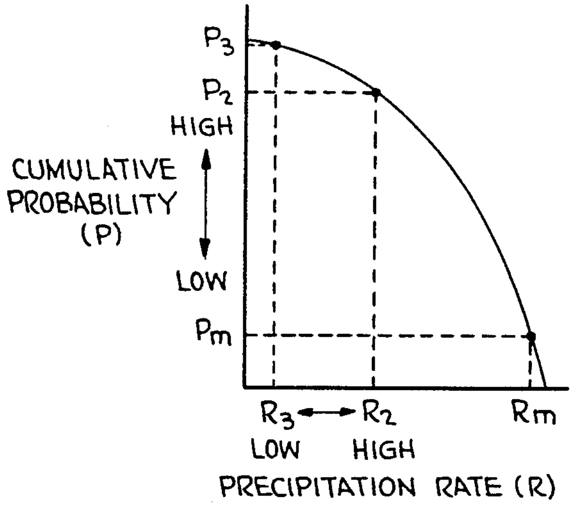
FIG. 2 illustrates the relationship between the precipitation rate R and the cumulative probability P of transmission between the satellite and an earth station and the manner in which the cumulative probability of transmission can be increased as a function of the precipitation rate.

For the purposes of the following description, it is assumed that there is no correlation between the precipitation rates at the location of the earth stations $A_1$, $A_2$ ... $A_N$, the statistical characteristics of the precipitation at the respective earth locations is identical, and the maximum precipitation rate encountered by the respective earth stations, when the precipitation rate R (per unit time) is used, is $Rm$ as illustrated in FIG. 2. It is also assumed that the cumulative probability corresponding to a given $Rm$ is $Pm$. With the above assumptions, the cumulative probability $P_2$ (of each earth station) that two earth stations among N earth stations may simultaneously produce rainfall at a cumulative probability $kPm$ will be $$P_2 = [2!\, kPm/N(N-1)]^{1/2} \quad (1)$$

wherein $k$ is a constant.

If $$[2!/N(N-1)] >> kPm \quad (2)$$

$$P_2 >> Pm \quad (3)$$

In a similar manner, the cumulative probability $P_3$ (of each earth station) that three earth stations may simultaneously produce rainfalls at a cumulative probability $Pm$ will be $$P_3 = [3!\, lPm/N(N-1)(N-2)]^{1/3} \quad (4)$$

If $$3/(N-2) >> (1/k)\, Pm \quad (5)$$

$$P_3 >> P_2 \quad (6)$$

In the same manner, cumulative probabilities $P_4$, $P_5$, etc. may also be calculated. From formulas (3) and (6), and assuming that the precipitation rates corresponding to $P_2$, $P_3$ ... etc. are $R_2$, $R_3$, ... etc., the conditions:

$$R_2 << Rm \qquad (7)$$

and $$R_3 << R_2 \qquad (8)$$

are obtained.

Figure 3:
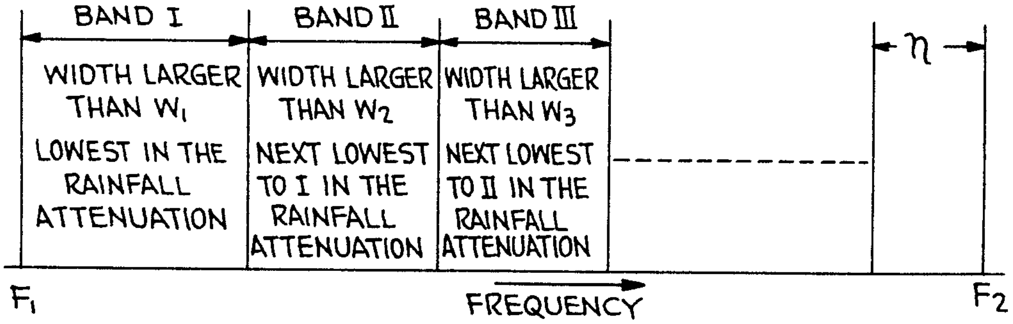
FIG. 3 illustrates the relationship of the frequency bands utilized in the transmission with respect to the precipitation.

It is apparent that $R_4$, $R_5$ ... etc. may be determined in the same manner. Thus, it is assumed that the precipitation rate R progressively reduces from $Rm$, $R_2$, $R_3$, ... etc. as illustrated in formulas (7) and (8). In the present invention, the frequency band $F_1$–$F_2$ is divided into a plurality of sub-bands I to *n* as illustrated in FIG. 3 and the various repeaters used in the frequency bands have characteristics which are well within the required transmission quality at the respective precipitation rates Rm, $R_2$, $R_3$ .... The degree of precipitation attenuation in frequency band I is so low that, even if the characteristics of the transmission are determined with respect to $R$m, the requirement for the enlargement of the antenna system, the increase of transmitting power, the improvement of the noise figure in the receiver and the increase of interference with other systems is slight. In Frequency bands II, III ... *n*, the degree of attenuation caused by rainfall progressively increases, but the over-all characteristics of the transmission are not significantly different from that which is obtained in optimum weather conditions because the precipitation rates $R_2$, $R_3$ ... Rm progressively decrease. Consequently, the improved satellite communication system of this invention is applicable not only to UHF transmission but also to narrow band transmission which utilizes simple and small communication devices requiring extremely low electrical power for both the earth and satellite repeating stations.

The following operational modes form a part of the present invention:

A. When all of the earth stations are in a non-precipitative state, or have a precipitation rate below $R_3$ and one, or a plurality of, stations are simultaneously under precipitation, the respective stations within the system utilize their present respective frequencies.

B. When one station is in a precipitation state of $R_3<R<R_2$, this station preferably uses any desired carrier wave in the frequency band I or II either for transmission or receiving.

C. When two stations $A_a$ and $A_b$ are simultaneously in respective rainfall states of $R_3<R_a<R_2$ and $R_3<R_b<R_2$, both stations preferably use any desired carrier frequency in the frequency band I or II.

D. When a station $A_c$ is in a rainfall state of $R_2<R_c$ and a station $A_d$ is in a rainfall state of $R_3<R_d<R_2$, station $A_c$ will preferably use any desired carrier frequency in the frequency band I and station $A_d$ preferably uses any other desired carrier wave than is being used by the station $A_c$ in the frequency bands I and II.

Thus, it is apparent that the present communication system correlates the frequency bands used by the respective stations relative to the state of precipitation at the respective stations and therefore, the satellite always will be operating in the frequency bands I to III, for example. Further, in the aforedescribed instances, stations $A_a$–$A_d$, are all in an operative state to effect communication between desired stations.

The change of state of a carrier wave for the earth stations is accomplished by monitoring the precipitation rate R, the received signal power, and signal-to-noise ratio to effect switching when the aforementioned characteristics have attained a predetermined discrimination or level value. Such a supervisory circuit may utilize the frequencies within the band $F_1$ to $F_2$ or utilize a separate frequency band. The supervising circuitry or network may be of either the central or dispersed type.

When the traffic capacities of the respective stations are all different and it is desirable to maintain communication as much as possible, it is necessary that the station having the largest traffic capacity be station $A_c$, and the station having the second largest traffic capacity is station $A_d$. Assuming that the station having the largest traffic capacity, the station having the second largest traffic capacity, and the station having the third largest traffic capacity, etc. among the N earth stations, have respective band widths $W_1$, $W_2$, $W_3$, etc., as illustrated in FIG. 3, the widths of the frequency bands I, II, etc. are respectively larger than $W_1$, $W_2$, etc. In such an instance, for each earth station, when the number of repeaters required to handle the traffic capacity of the station is designated by M, the number, Q, of the equipment for transmitting and receiving high frequency signals is determined relative to the frequency bands $W_1$, $W_2$, etc. as Q>M. However, as is evident from the aforedescribed explanation, the present invention minimizes the influence of the effects of precipitation attenuation on the communications between the respective earth stations, and therefore each repeating installation requires equipment using low electric power, having small size and low cost, and therefore the expense required for such equipment is practical.

The cumulative probability Pc of the communication interruptions in the aforedescribed situation is $$Pc = (2Pm/N)\,(N + k + 1 + ...).$$

Thus, the parameters of the system may be selected by taking into consideration the desired minimization of Pc and the design of the devices used in frequency bands I, II, III, etc. In the event that the precipitation attenuation is large or great at one particular station, a part of the traffic capacity may be purposely interrupted. However, in such instance, taking as an example the three frequency bands I, II, III as described above, the respective band widths $W_1$, or $W_1$ and $W_2$, may be selected to be respectively narrower than normal and the band width $W_3$ of band III, assuming it to be the band width at the station where the precipitation attenuation is large, may be made wider.

The above description relates to the situation where a repeating station S occupies or uses the band of frequencies $F_1$ to $F_2$. However, the present invention is applicable to a communication system wherein separate frequency bands are used. Further, the present invention is useful in communication systems wherein a plurality of satellite communication stations $S_1$, $S_2$, ... $S_n$ are used wherein each communication satellite uses a separate frequency band.

It is also apparent that if there is indeed a correlation between the precipitation at respective stations, the calculations corresponding to the formulas in (1), (4) will be more complicated and the effect of the present system will be reduced or lower than is indicated by formulas (1) and (3); however, a considerable improvement will still be realized. In the case where the statistical properties of the precipitation in the respective stations are different from each other, the calculations will be complicated, but the effect of the system will not be reduced.

In the satellite communication system according to the present invention, consideration must be given to whether or not a selective frequency band circuit is present in the satellite and therefore there are two different cases: (A) wherein only the earth station has a selective frequency band circuit, and (B) where both the satellite and earth station have respective selective frequency band circuits. FIGS. 4*a* and 4*b* illustrate frequency band allotments for the respective stations of the communication system for case (A). In FIGS. 4*a* and 4*b*, $A_1$–$A_8$ represent earth stations and S represents an artificial satellite having necessary antenna and relay equipment. The satellite antenna is illustrated as having three parts solely for the purposes of the Figure and the convenience of illustration. It is apparent that such an antenna system may have any number of antennas, or only one antenna. In FIGS. 4*a* and 4*b*, the frequency transmission illustrated with a hatched band, a solid line, and with broken lines relates respectively to frequencies within bands I, II and III as illustrated in FIG. 3.

In FIG. 4*a*, earth station $A_1$ is subjected to heavy precipitation and station $A_4$ is subjected to light precipitation, and the other stations have no precipitation at all. Therefore, in accordance with the foregoing description, the frequency range band I, which has the lowest precipitation attenuation, is preferably allotted to station $A_1$; and frequency range band II, which is the second lowest precipitation attenuation, is allotted to station $A_4$. In FIG. $4_b$, earth station $A_6$ is subjected to heavy precipitation, station $A_2$ is subjected to a light amount of precipitation, and the remaining stations have no precipitation. Therefore, band I is preferably assigned to station $A_6$; and band II is assigned to earth station $A_2$. In both FIGS. 4*a* and 4*b*, $A_1$ is a master control station which is connected with the other stations $A_2$, $A_3$, ... $A_6$ by means of two transmission paths, that is, through a monitoring and controlling wireless circuit via the satellite, which uses part of the frequency band, and through a monitoring and control wire circuit L, which is a ground system. The dual transmission system improves the reliability so that the precipitation information and the signal receiving condition of each station may be monitored and an instruction for allotting the switching of the frequency at each station may be transmitted through the monitoring and controlling circuit.

Figure 5B:
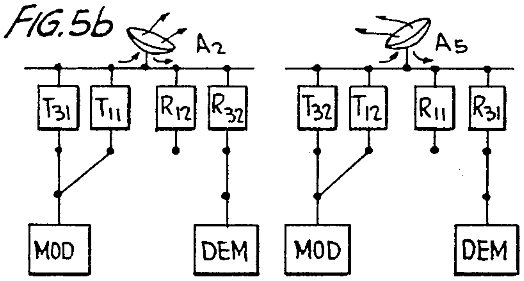
Figure 5C:
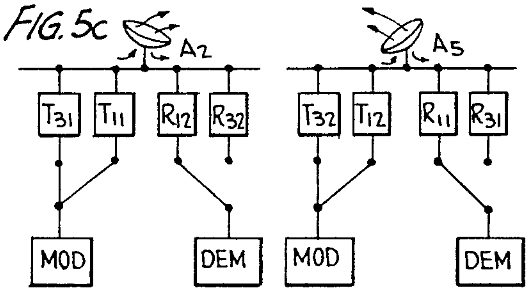
Figure 5D:
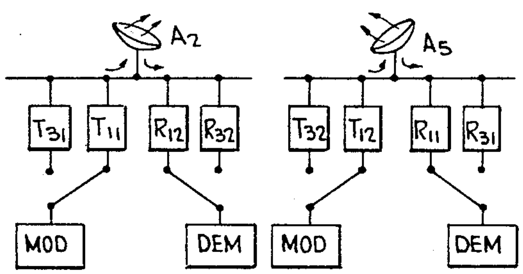

FIGS. 5*a* through 5*d* illustrate the switching order of the frequencies for the transmitting and receiving circuits at each station, for example, as is necessary between earth stations $A_2$ and $A_5$ when the precipitation conditions are changed from those illustrated in FIG. 4*a* to that which is illustrated in FIG. 4*b*. FIG. 5*a* corresponds to the precipitation state shown in FIG. 4*a*, wherein, for example, a signal having a frequency band $F_{31}$ within frequency range band III, is transmitted from transmitter $T_{31}$ of station $A_2$ and is received by receiver $R_{31}$ of station $A_5$. A channel utilizing frequency $f_{32}$, within the same frequency range as $f_{31}$, is transmitted from transmitter $T_{32}$ of station $A_5$ and is received by receiver $R_{32}$ of station $A_2$. The blocks represented by MOD and DEM respectively represent an intermediate frequency signal modulating circuit and an intermediate frequency signal demodulating circuit. When the monitoring of the precipitation state of the various earth stations indicates a change in precipitation from that illustrated in FIG. 4*a* to that which is illustrated in FIG. 4*b*, controlling station $A_1$ transmits an instruction to station $A_2$ and $A_5$ so that their respective transmission states are switched in parallel as illustrated in FIG. 5*b*. That is, the same signal is transmitted simultaneously from station $A_2$ from a channel modulated with a frequency $F_{31}$ and with a channel modulated with a back-up frequency $F_{11}$, both frequencies within the frequency range band I of the lowest precipitation attenuation; and from station $A_5$ the same signal is transmitted simultaneously with a channel modulated by a frequency $F_{32}$ and with a back-up channel modulated with a frequency $F_{12}$, both frequencies also within band I. When the monitoring circuitry indicates that the deterioration of the transmission in the respective channels transmitting frequencies $F_{31}$ and $F_{32}$ is continuous, as denoted by the reception in receivers $R_{31}$ and $R_{32}$ of stations $A_5$ and $A_2$, respectively, the receivers are immediately switched, as illustrated in FIG. 5c, and connected respectively to receivers $R_{11}$ and $R_{12}$. The parallel transmission from the transmitters of stations $A_2$ and $A_5$ is switched, as illustrated in FIG. 5d, so that the respective transmissions from station $A_2$ and $A_5$ are to be modulated by frequencies $F_{11}$ and $F_{12}$. Similarly, the reception at stations $A_2$ and $A_5$ is respectively switched to be demodulated by frequencies $F_{12}$ and $F_{11}$. The switching previously described avoids fading or the like and circuit transmission interruption, with consideration given for the wave propagation time of the signals between the transmitting stations. It is obvious that the back-up frequency bands $F_{11}$ and $F_{12}$ may be switched to other frequency bands $F_{N1}$ and $F_{N2}$, respectively, utilizing a repetition of the same procedure as described above.

FIG. 6b illustrates a simple exemplary apparatus for determining the precipitation rate at each earth station. Precipitation is collected by funnel 14 and drained into cup 16, which forms one side of a mechanical balance having a fixed shaft 18 as a fulcrum. Electric contact 20 is mounted on arm 22 and the fulcrum and shaft remain mechanically balanced when cup 16 is empty. Contact 20 is connected to battery 24 as illustrated. As precipitation accumulates in cup 16, the balance is shifted so that electrical contact 20 engages contact 26; the latter contact is connected to the input terminal of a pulse counter circuit 28. Simultaneously therewith, the precipitation spills from cup 16, thereby restoring the mechanical balance and disengaging contacts 20 and 26 from one another. Therefore, each time cup 16 is filled with precipitation, a pulse signal is added to counter 28. It is obvious that when the occurrence of precipitation is low, the frequency of occurrence of the pulse signal will also be low and similarly, when the occurrence of precipitation is high, the occurrence of pulse signals will be proportionally frequent. Counter 28 may be set to emit a signal when the number of input pulses applied during a given time interval exceeds a predetermined number. Further, different signals may be emitted in accordance with the amount of precipitation so as to distinguish between light, medium and heavy precipitation. The signal from counter 28 is applied to the input of local monitor and controller 12 at each station as illustrated in FIG. 6*a*.

In FIG. 6*a*, central monitor and controller 10, located at at least one controlling station among a plurality of earth stations, for example, such as station $A_1$, is connected to a local monitor and controller 12 in each station by means of wire circuit L and the transmission circuit via the satellite. Although not illustrated, local monitor and controller 12 may also be provided with a pilot signal indicating the reception level at the station and also, if necessary, a signal representing the noise at the receiver. In response to the aforementioned signals, local monitor and controller 12 transmits the status of each earth station to central monitor and controller 10. Central monitor and controller 10, in response to such signals, allots frequency bands, for example, such as band I, II, III, etc. to the respective earth stations in accordance with the amount of detected precipitation at that station. The necessary controlling signals are transmitted from central monitor and controller 10 to a respective switch driving controller 30, located at each earth station. Alternatively, the precipitation control signals may be directly supplied to switch driving controller 30 from local monitor and controller 12. Switch driving controller 30 generates a switch driving signal and transmits it to intermediate frequency signal switching boards 34, 36. Simultaneously therewith, switch driving controller 30 also generates a transmitting frequency converter on/off signal and transmits it to transmitting frequency converters $T_{31}$ ... $T_{21}$ ... $T_{11}$ via signal switching board 36.

Intermediate frequency signal switching board 36 switches and connects the outputs of intermediate frequency modulators $MOD_a$, $MOD_1$, ... $MOD_5$ at the transmitting side to the transmitting frequency converter $T_{31}$ ... $T_{21}$ ... $T_{11}$. Frequency modulators $MOD_a$–$MOD_5$ each operate at different frequency bands. Similarly, intermediate frequency signal switching board 34 switches and connects the input of a respective intermediate frequency demodulator $DEM_a$–$DEM_5$ on the receiving side to a selected receiving frequency converter $R_{31}$ ... $R_{21}$ ... $R_{11}$. Intermediate frequency demodulators $DEM_a$–$DEM_5$ also each operate at different frequency bands. Both intermediate frequency switching boards 34 and 36 may be formed of a relay matrix or an integrated switching circuit, which connects desired demodulator or modulator signals with a respective receiving frequency converter or transmitting frequency converter, respectively. The input terminals of intermediate frequency modulators $MOD_a$–$MOD_5$ are connected to suitable carrier terminal equipment. Similarly, intermediate frequency demodulators $DEM_a$–$DEM_5$ have output terminals connected to suitable carrier terminal equipment. Transmitting frequency converters $T_{31}$ ... $T_{21}$ ... $T_{11}$ each include an amplifier for amplifying the signal which is transmitted via antenna 46. Receiving frequency converters $R_{31}$ ... $R_{21}$ ... $R_{11}$ convert signals received via antenna 46 to an intermediate frequency within bands I, II, III, etc. In FIG. 6a, the subscripts associated with T and R, respectively in the transmitting frequency converters and the receiving frequency converters, indicates that the transmitting and receiving frequency bands belong to a corresponding frequency range band. For example, suffixes 31, 32, etc. indicate that the frequency is within range band III. Further, the subscript S indicates that the respective device is a back-up apparatus.

The operation of the circuitry illustrated in FIG. 6a will now be described with reference to the precipitation conditions of station $A_5$ as illustrated in FIGS. 4a and 4b. The switching connections are illustrated in FIGS. 5a–5d. Thus, assuming the change in precipitation conditions from that which is illustrated in FIG. 4a to that which is illustrated in FIG. 4b, and further assuming that the precipitation state at station $A_5$ in FIG. 4b represents a condition warranting transmission from a frequency in band III, the precipitation state by counter 28 to local monitor and controller 12 is transmitted to central monitor and controller 10 at a central control station $A_1$. The controlling signal emitted from central monitor and controller 10 is added to the switch driving controller and/or the controlling signal emitted by local monitor and controller 10 of station $A_5$, and these signals are added directly to switch driving controller 30 to generate a switch driving signal which is transmitted to intermediate frequency signal switching board 36. Intermediate frequency signal switching board 36 connects the output from modulator $MOD_2$ to transmitting frequency converter $T_{32}$ and transmitting frequency converter $T_{15}$. Simultaneously therewith the transmitting frequency converter on/off signal generated at the output of switch controller 30 is supplied to the transmitting frequency converters $T_{32}$ and $T_{15}$ to initiate the transmission of signals.

Simultaneously with the foregoing operation, switch driving controller 30 also controls intermediate signal switching board 34 to disconnect intermediate frequency demodulator $DEM_2$ and receiving frequency converter $R_{31}$ from one another and to complete a connection between intermediate frequency demodulator $DEM_2$ and receiving frequency converter $R_{15}$. Subsequently, the switch driving signal and the transmitting frequency converter on/off signal are transmitted respectively to the intermediate frequency signal switching board 36 and transmitting frequency converter $T_{32}$ to break the connection between intermediate frequency modulator $MOD_2$ and transmitting frequency converter $T_{32}$. This stops the transmitting operation of transmitting frequency converter $T_{32}$, thereby removing the parallel transmission path and completes the frequency band switching and connecting operation. It is apparent that a back-up frequency band may also be provided via other transmitting frequency converters and receiving frequency converters by a repetition of the process described above.

The foregoing description represents the necessary switching and connecting procedures for the situation where only the earth stations contain selective frequency band switching circuitry, and the switching procedure is relatively complicated. However, in the case where the satellite also includes a selective frequency band switching circuit, the connecting and switching functions are considerably simplified. FIGS. 7a and 7b illustrate the frequency band allotments for the respective stations in the latter situation and FIGS. 7a, 7b, correspond to the precipitation conditions indicated in FIGS. 4a, 4b, respectively. As illustrated in FIG. 7a, frequency range band I, representing the lowest precipitation attenuation, is allotted only to station $A_1$; band II, representing the second lowest precipitation attenuation, is allotted only to station $A_4$; however, in FIG. 7b, band I is allotted only to station $A_5$; and band II is allotted only to station $A_2$. The selective frequency band switching circuit in the satellite is similar to that previously described for the earth stations with respect to FIG. 6a.

It is obvious that the manner in which the frequency band $F_1$ to $F_2$ is to be divided and used may be determined by a consideration of the transmission quality N as described with regard to formula (9), the fluctuation of the traffic capacity of the system, the precipitation rate, the received power at an individual station, the signal-to-noise ratio of an earth station, and also the complexity of the supervisory system which is necessary to switch the carrier frequencies of the repeating stations within the communication system.

The present invention may be modified to make the precipitation attenuation reduction more effective. FIG. 8 illustrates such a modification, wherein, for the sake of simplification only, one station $A_j$ among a plurality of earth stations $A_1$–$A_N$ illustrated in FIG. 1, is shown. Back-up station $A_j'$, having the same function as station $A_j$, is parallel with station $A_j$ at a distance $L_j$ therefrom. Distance $L_j$ is determined so that the correlation of rainfall between station $A_j$ and station $A_j'$ is small so that when station $A_j$ has a high precipitation rate, the communication with satellite S may be continued via station $A_j'$ which is not under high precipitation conditions. Thus, if a precipitation rate $R_m$ is present in the location of station $A_j$ or $A_j'$, the precipitation rate of the two stations $A_j$ and $A_j'$, taken together, will be reduced to a precipitation rate *Rm' which is lower than* $R_m$. Thus, the communication transmission for such a station group may be continued with the system designed to satisfy the transmission quality for the precipitation rate $R_{m1}$.

Further, it is apparent that the above described diversity system may be extended to encompass a plurality of station groups, each having within them a number of stations. In such a manner a given transmission and reception standard can be obtained at a lower precipitation rate than without such a diversity system. The calculations for the additional stations are performed in a manner similar to that previously described. Therefore, the economy gained by a reduced power requirement because of a reduced precipitation rate may more than compensate for the increased expense accompanying the necessity of back-up stations and their associated transmission circuits so as to produce an over-all advantage with such a diversity system. Further, such a diversity system has applications in the situation where certain frequency bands such as I or II cannot be used because of interference problems created by the presence of terrestrial communication systems or the like, or in the case where there is a significant increase in the traffic capacity obtained by the use of extremely high frequency band.

What is claimed is:

1. A satellite communication system using selected frequency bands for transmission between a group of terrestrial stations and at least one satellite wherein one of said terrestrial stations is a central control station having communication paths to each of the other terrestrial stations via said satellite and a ground link, comprising; means at said central control station for determining whether the rainfall at said terrestrial stations exceeds a maximum acceptable precipitation rate for communication and for transmitting to said other terrestrial stations switching control signals when the precipitation rate exceeds said maximum acceptable precipitation rate, each of said terrestrial stations comprising; transmitting and receiving frequency converter means, carrier terminal equipment connected to said converters, each converter means including a plurality of converters tuned to a selected frequency band, precipitation collecting and measuring means for determining the incident rate of precipitation at said station and transmitting an output indication thereof to said control station, and means responsive to said control signals for switching the station transmission and reception from converter means having a frequency band attenuated by said precipitation to converter means having a frequency band less affected by said precipitation.

2. A satellite communication system as in claim 1 wherein each of said stations includes a back-up station located at a position spaced from its associated terrestrial station to have a small precipitation correlation therewith and means at each station for switching to said back-up station.

3. A satellite communication system as in claim 1 wherein each of said terrestrial stations further comprises a plurality of intermediate frequency modulators and demodulators each operating at a different frequency band and interconnecting, respectively, said carrier terminal equipment and an associated receiving and transmitting converter.

4. A satellite communication system as in claim 3 wherein said means for switching is a pair of diode matrices each having outputs respectively connected to said transmitter converters and to said receiver converters and each having inputs respectively connected to said modulators and to said demodulators.

* * * * *